US010188127B2

(12) United States Patent
Baungaard et al.

(10) Patent No.: US 10,188,127 B2
(45) Date of Patent: Jan. 29, 2019

(54) METHOD FOR PRODUCING FROZEN ICE CREAM PRODUCTS

(71) Applicant: TETRA LAVAL HOLDINGS & FINANCE S.A., Pully (CH)

(72) Inventors: Elsebeth Baungaard, Skanderborg (DK); Morten Have Kudsk, Brabrand (DK)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 640 days.

(21) Appl. No.: 14/652,726

(22) PCT Filed: Dec. 17, 2013

(86) PCT No.: PCT/EP2013/076940
§ 371 (c)(1),
(2) Date: Jun. 16, 2015

(87) PCT Pub. No.: WO2014/095892
PCT Pub. Date: Jun. 26, 2014

(65) Prior Publication Data
US 2015/0335041 A1    Nov. 26, 2015

(30) Foreign Application Priority Data

Dec. 19, 2012 (DK) .................................. 2012 70799

(51) Int. Cl.
*A23G 9/22* (2006.01)
*A23G 9/04* (2006.01)
*A23G 9/26* (2006.01)

(52) U.S. Cl.
CPC ............... *A23G 9/222* (2013.01); *A23G 9/04* (2013.01); *A23G 9/26* (2013.01)

(58) Field of Classification Search
CPC ............. A23G 9/04; A23G 9/26; A23G 9/222
See application file for complete search history.

(56) References Cited

U.S. PATENT DOCUMENTS 2,811,933 A * 11/1957 Prasz ........................ A23G 1/26
198/793
3,648,625 A    3/1972 Glass
(Continued)

FOREIGN PATENT DOCUMENTS

EP              2 471 377 A1    7/2012
WO    WO 02/078460 A1    10/2002
(Continued)

OTHER PUBLICATIONS

International Search Report (PCT/ISA/210) dated Mar. 4, 2014, by the European Patent Office as the International Searching Authority for International Application No. PCT/EP2013/076940.

*Primary Examiner* — Steven N Leff
(74) *Attorney, Agent, or Firm* — Buchanan Ingersoll & Rooney PC

(57) ABSTRACT

A method is disclosed for optimization of a production of frozen ice cream products, such as extruded edible ice cream products, from a freezing system comprising a freezing apparatus, comprising recording one or more properties of the production, such as one or more measured values related to the freezing system during the production process, and using the one or more recorded properties for controlling one or more operational parameters of the freezing system. The method also involves conveying pre-products to be frozen into the freezing apparatus, cooling the pre-products to form frozen products inside the freezing apparatus, conveying the frozen products out of the freezing apparatus measuring one or more surface temperatures of frozen products leaving the freezing apparatus, and using the one or more measured surface temperatures for controlling one or more operational parameters of the freezing apparatus.

6 Claims, 6 Drawing Sheets

(56) References Cited

U.S. PATENT DOCUMENTS

Figure 1:
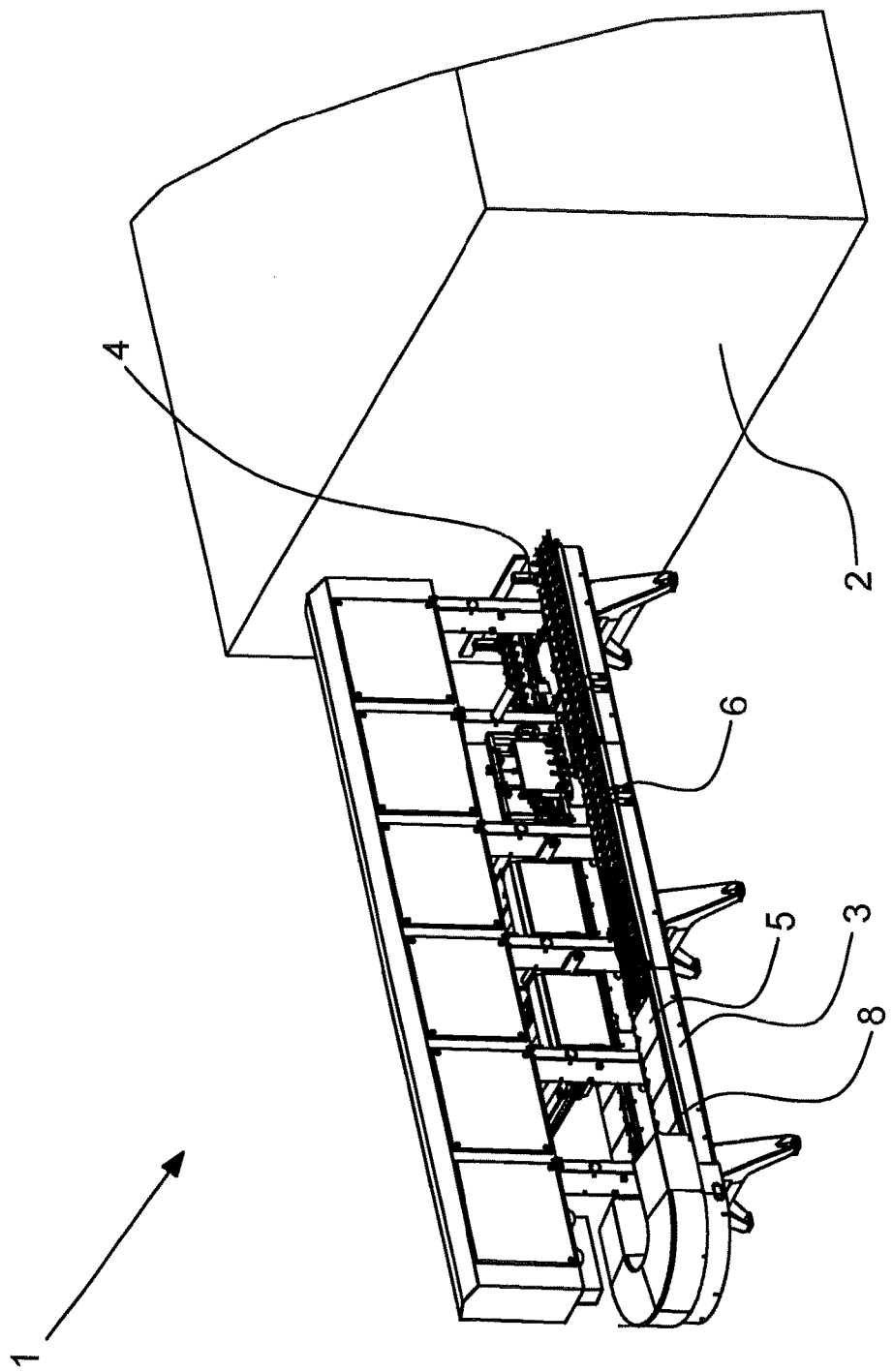

| | | | |
|---|---|---|---|
| 4,209,288 A * | 6/1980 | Tumey | A23G 7/02 425/113 |
| 4,346,120 A | 8/1982 | Morley et al. | |
| 4,527,972 A * | 7/1985 | Carlsson | A23G 9/04 249/127 |
| 4,745,762 A * | 5/1988 | Taylor | F25D 3/11 198/460.1 |
| 5,714,187 A * | 2/1998 | Froidevaux | A23N 17/005 264/40.1 |
| 6,866,417 B2 * | 3/2005 | Gunawardena | G05D 23/1935 374/121 |
| 7,374,579 B2 * | 5/2008 | Larson | A22C 7/00 425/289 |
| 2005/0072321 A1 | 4/2005 | Larsen | |
| 2006/0054614 A1 | 3/2006 | Baxter et al. | |
| 2010/0239723 A1 | 9/2010 | Pendergast et al. | |
| 2012/0168093 A1 * | 7/2012 | Savarese | F26B 3/28 159/47.1 |
| 2014/0220193 A1 * | 8/2014 | Hocker | G01K 13/00 426/231 |

FOREIGN PATENT DOCUMENTS

| | | |
|---|---|---|
| WO | 02/089596 A1 | 11/2002 |
| WO | 2005/004626 A2 | 1/2005 |
| WO | 2006/111265 A1 | 10/2006 |
| WO | WO 2010/098851 A2 | 9/2010 |

* cited by examiner

METHOD FOR PRODUCING FROZEN ICE CREAM PRODUCTS

The present invention relates to a method for producing frozen ice cream products, such as extruded edible ice cream products, using a freezing system comprising a freezing apparatus.

BACKGROUND OF THE INVENTION

When producing frozen extruded ice cream products, it is a common practice to place extruded pre-products to be frozen onto product plates arranged on a conveyor and then to convey the pre-products through a freezing apparatus, often in the form of a freezing tunnel, for cooling the pre-products so that they leave the freezing apparatus again as frozen products.

The degree, to which the products are frozen when passing through the freezing apparatus, is a very important parameter of the production process. Whereas the pre-products are relatively sticky and, to some extent, adhere to the product plates, the frozen products are less sticky the harder they are frozen.

This means that, if the products are not sufficiently frozen, they stick too much to the product plates and may be damaged when trying to remove them therefrom. On the other hand, if the products are subject to excessive freezing, they may loosen completely from the product plates and fall off the product plates on their way through the freezing apparatus. This may, for instance, happen, where there is a curve or a turn on the conveyor, or due to flows of cooling air inside the freezing apparatus.

In freezing systems known in the art, it requires skilled and experienced operators to ensure that the freezing process is performed optimally, so that neither insufficient nor excessive freezing of the products takes place in the freezing apparatus.

BRIEF DESCRIPTION OF THE INVENTION

It is an object of the present invention to provide a freezing system with a higher degree of automated control so that less demand is put on the operator but high-quality products can still be obtained.

The present invention relates to a method for producing frozen ice cream products, such as extruded edible ice cream products, using a freezing system comprising a freezing apparatus, said method comprising the steps of conveying pre-products to be frozen into the freezing apparatus, cooling the pre-products to form frozen products inside the freezing apparatus, conveying the frozen products out of the freezing apparatus, measuring one or more surface temperatures of frozen products leaving the freezing apparatus, and using the one or more measured surface temperatures as input for a control device for controlling one or more operational parameters of the freezing apparatus.

Using surface temperatures for controlling operational parameters of the freezing apparatus allows for a more automated optimization of the production process and reduces the dependency on skilled operators of the freezing system for obtaining frozen ice cream products of the desired optimum quality.

In an embodiment of the invention, the method further comprises the steps of placing the pre-products to be frozen onto a number of product plates before conveying them into the freezing apparatus, cooling the pre-products to form frozen products while conveying them around inside the freezing apparatus by exposing them to cold air provided and circulated by means of fans and/or evaporators, and lifting the frozen products off the product plates, after conveying them out of the freezing apparatus, by means of a product handling system driven by a driving arrangement, such as one or more servo motors.

Placing the pre-products on product plates before conveying them into the freezing apparatus results in an easy and safe handling of the pre-products and the frozen products before, during and after the step of cooling.

In an embodiment of the invention, the freezing system further comprises a work table and the product plates are placed on the work table when the pre-products to be frozen are placed onto the product plates and/or when the frozen products are lifted off the product plates.

The use of a work table for handling the pre-products before the cooling and the products after the cooling enables for an easy and safe handling of the pre-products and the products.

The expression "work table" is to be understood as any platform by which the product plates are supported when outside the freezing apparatus. Preferable, a single conveyor system is used for transporting the product plates around inside the freezing apparatus and across an upper surface of the work table.

In an embodiment of the invention, the method further comprises, before the step of lifting the frozen products off the product plates, the step of loosening the frozen products from the product plates by tapping the product plates while holding the frozen products in place thereon.

The introduction of this step has proven to ease the separation of the frozen products from the product plates without damaging the frozen products.

In an embodiment of the invention, one or more torque values exerted by the driving arrangement are measured during the step of lifting the frozen products off the product plates and used as input for a control device for controlling one or more operational parameters of the freezing system.

In an embodiment of the invention, the one or more measured torque values include the maximum torque exerted by the driving arrangement during the lifting process.

The torque, especially the maximum torque, exerted by the driving arrangement is a useful input for a control system because it is closely related to the force necessary to lift the frozen products off the product plates, which force, in turn, is a very good indicator of the ability of the frozen products to be released from the product plates.

In an embodiment of the invention, the one or more controlled operational parameters include one or more evaporation temperatures and, thereby, one or more air temperatures within the freezing apparatus.

In an embodiment of the invention, the one or more controlled operational parameters include one or more fan speeds and, thereby, one or more speeds of air circulated within the freezing apparatus.

In an embodiment of the invention, the one or more controlled operational parameters include the period of time passed from a given product to be frozen enters the freezing apparatus to the same product leaves the freezing apparatus again as a frozen product.

The correct degree of freezing of the frozen products can be obtained by controlling the air temperature(s) and speed(s) within the freezing apparatus and/or the period of time spent by any given product within the freezing apparatus.

In an embodiment of the invention, the period of time passed is controlled by regulating a speed of a conveyor extending within the freezing apparatus.

A simple way of controlling the period of time spent by a given product within the freezing apparatus is by regulating the speed of a conveyor extending within the freezing apparatus, which has a direct influence on the period of time passed from a given product to be frozen enters the freezing apparatus to the same product leaves the freezing apparatus again as a frozen product.

In an embodiment of the invention, the control of the one or more operational parameters are performed in such a way that the one or more measured surface temperatures are kept within ranges, which are calculated taking into account certain product-specific parameters, such as the size and shape of the products and the materials from which the products are made.

In an embodiment of the invention, the control of the one or more operational parameters are performed in such a way that the one or more measured torque values are kept within ranges, which are calculated taking into account certain product-specific parameters, such as the size and shape of the products and the materials from which the products are made.

In an embodiment of the invention, an algorithm for controlling the one or more operational parameters takes into account certain product-specific parameters, such as the size and shape of the products and the materials from which the products are made.

Using product-specific parameters as basis for the ranges within which the measured surface temperatures and torque values are allowed to vary and as basis for the control algorithms enables the control system to be optimized for production of the specific products being produced.

In an embodiment of the invention, the control of the one or more operational parameters is performed using a control loop feedback mechanism, such as PID control or PI control.

In an aspect of the invention, it relates to a method for producing frozen ice cream products, such as extruded edible ice cream products, using a freezing system comprising a freezing apparatus, said method comprising the steps of recording one or more properties of the production, such as one or more measured values related to the freezing system during the production process, and using the one or more recorded properties as input for a control device for controlling one or more operational parameters of the freezing system.

In an embodiment of the invention, this method includes the method steps described here above.

In an embodiment of the invention, the recording of one or more properties further includes vision control or other methods to make sure that the frozen products do not stick to the product plates when being lifted off.

Including vision control or other methods in the properties recorded enables for an even further automated optimization of the production.

In an aspect of the invention, it relates to a control system for a freezing system comprising a freezing apparatus, said control system comprising one or more temperature sensors for measuring surface temperatures of frozen products leaving the freezing apparatus and a control device for setting operational parameters of the freezing apparatus in dependency of the measured surface temperatures.

In an embodiment of the invention, the one or more temperature sensors are infrared sensors.

In an aspect of the invention, it relates to a freezing system for production of frozen products, such as edible ice cream products, said freezing system comprising a freezing apparatus and a control system as described above.

In an aspect of the invention, it relates to a computer program product stored on a computer readable medium comprising software instructions for performing one or more of the method described above.

FIGURES

Figure 2:
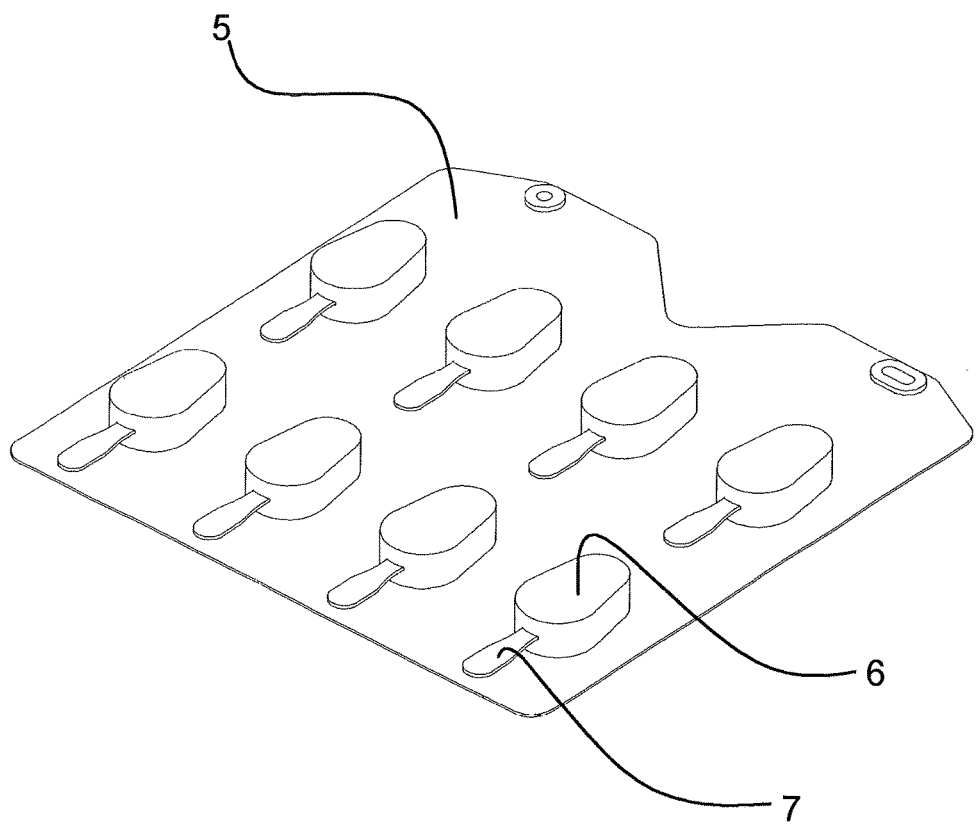
Figure 3:
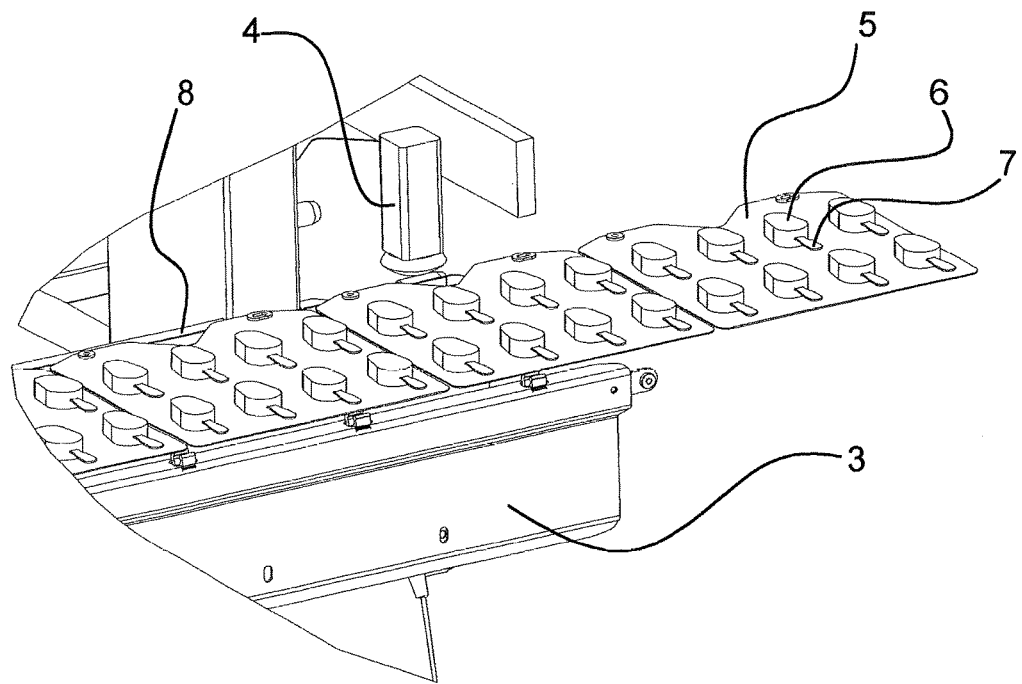
Figure 4:
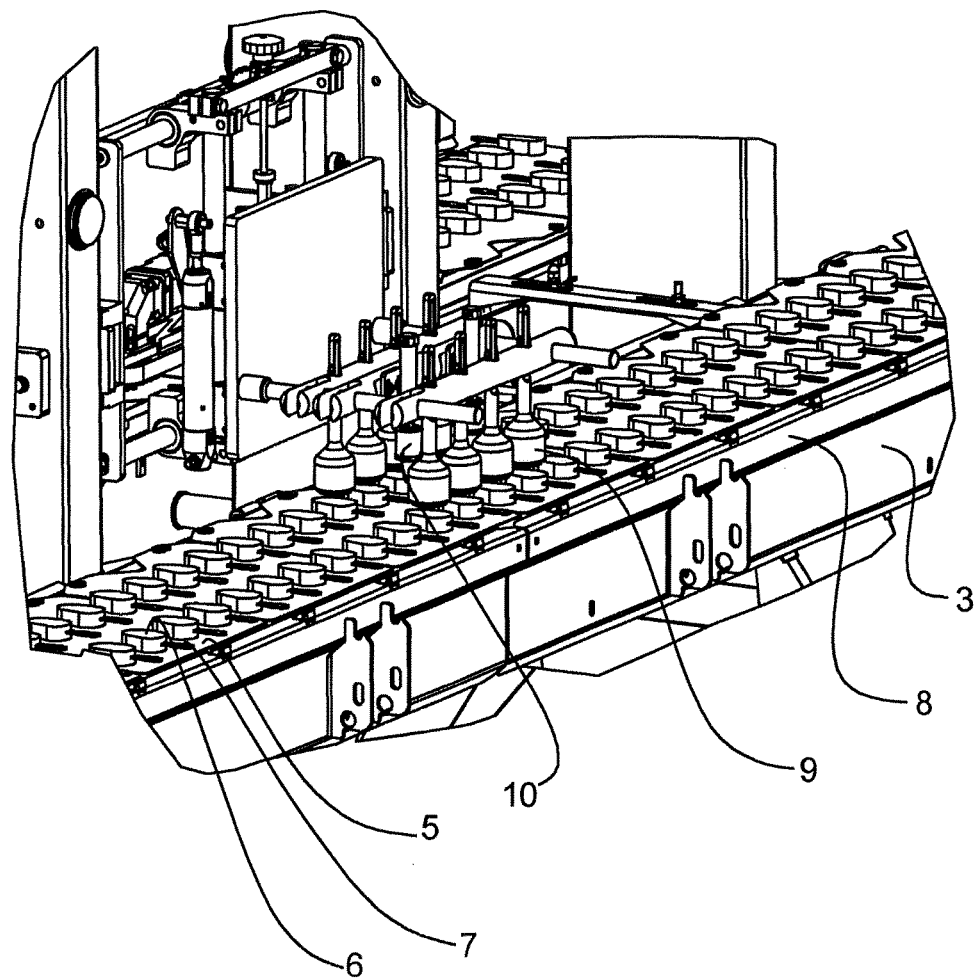
Figure 5:
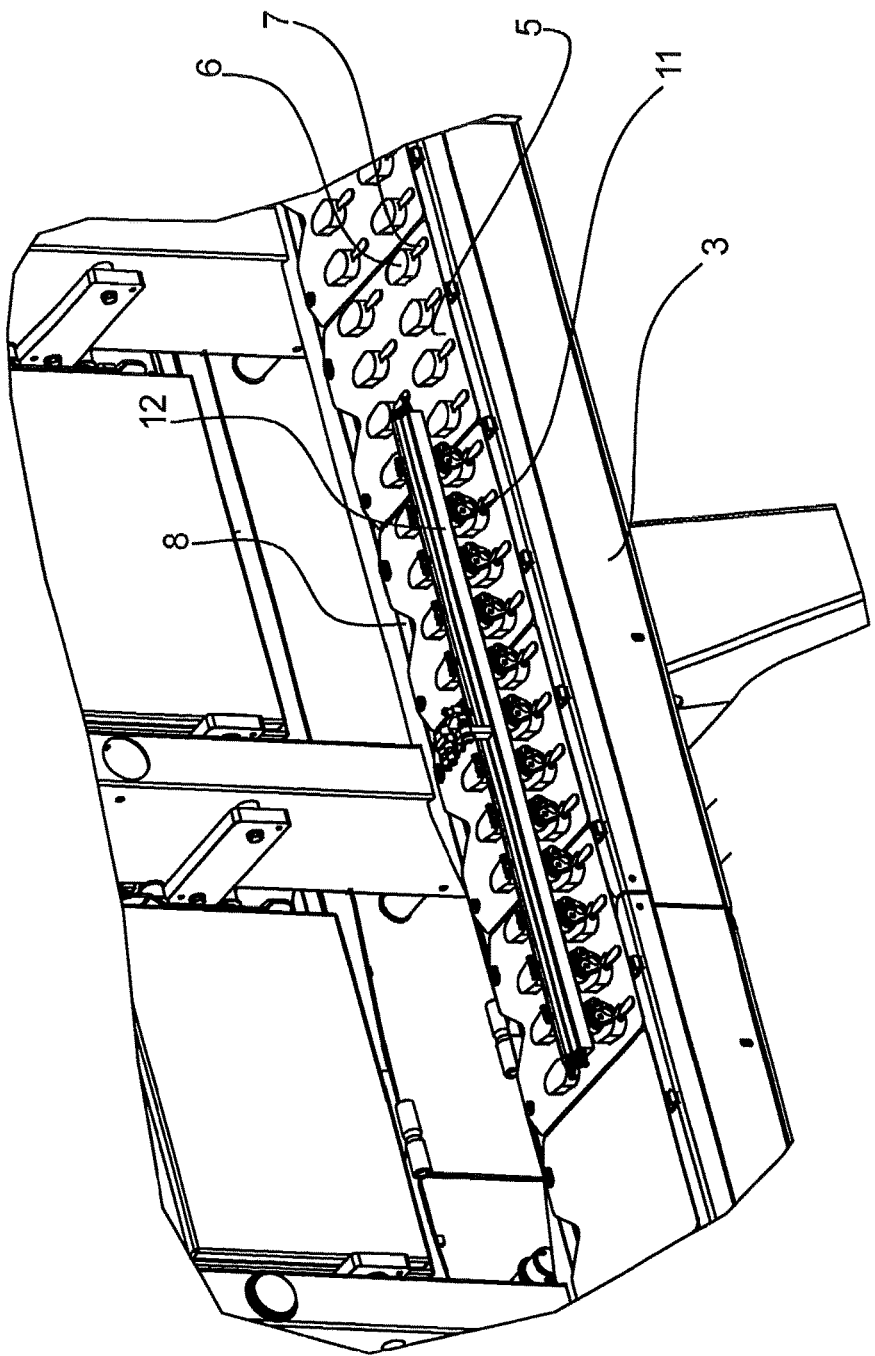
Figure 6:
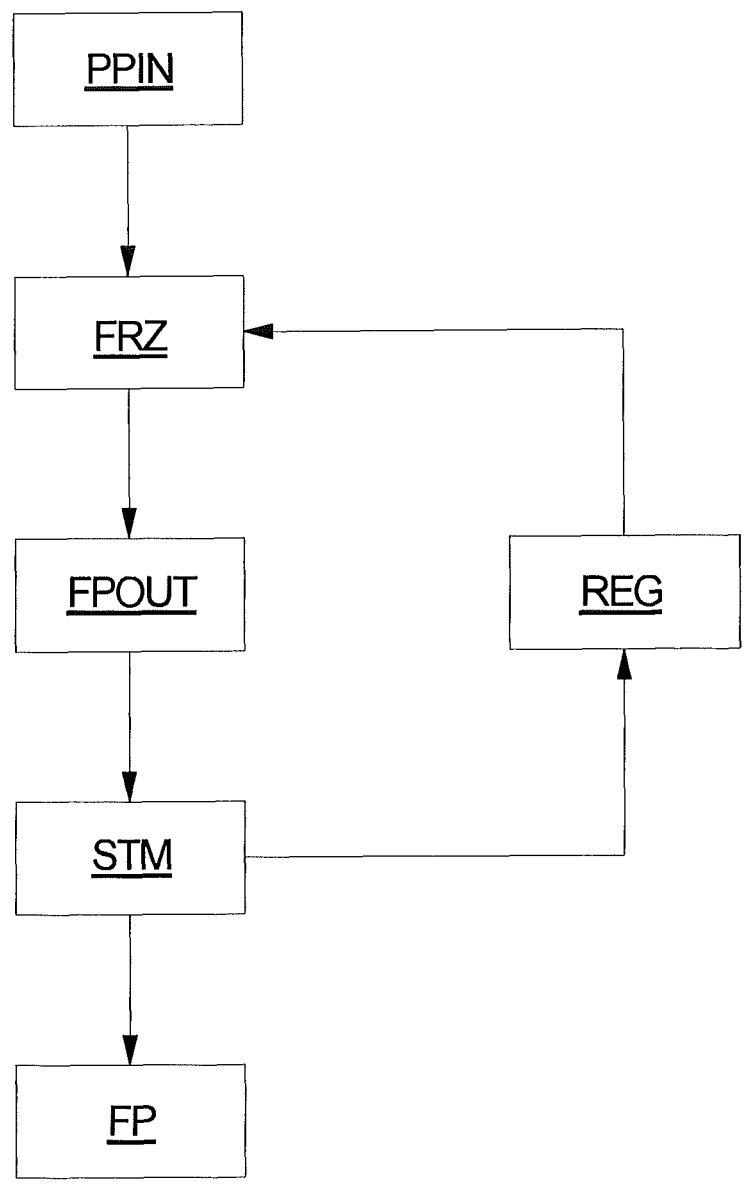

A few exemplary embodiments of the invention are described in more details in the following with reference to the figures, of which FIG. 1 is a perspective view of a freezing system according to an embodiment of the invention, FIG. 2 is a perspective view of a product plate of a freezing system according to an embodiment of the invention, FIG. 3 is a closer perspective view of a first specific part of a freezing system according to an embodiment of the invention, FIG. 4 is a closer perspective view of a second specific part of a freezing system according to an embodiment of the invention, FIG. 5 is a closer perspective view of a third specific part of a freezing system according to an embodiment of the invention, and FIG. 6 is a flow diagram showing the basic method steps of a production process according to a preferred embodiment of the invention.

DETAILED DESCRIPTION OF THE INVENTION

FIG. 1 is a perspective view of a freezing system 1 according to an embodiment of the invention. The illustrated embodiment comprises a freezing apparatus 2 in the form of a freezing tunnel, and a work table 3, which is arranged in close connection with the freezing apparatus 2.

An endless conveyor 8 extends along the surface of the work table 3, into the freezing apparatus 2, around inside the freezing apparatus 2 along a path therein, out of the freezing apparatus 2 again, and back onto the work table 3.

A plurality of product plates 5 are placed on top of the conveyor 8. In FIG. 1, the product plates 5 on the back side of the illustrated work table 3 carry pre-products to be frozen into the freezing apparatus 2, whereas the product plates 5 on the front side of the illustrated work table 3 carry frozen ice cream products 6, which have just come out of the freezing apparatus 2.

This figure further illustrates how one or more temperature sensors 4, for instance in the form of infrared sensors, are arranged near the place, where the conveyor 8 leaves the freezing apparatus 2, for measuring the surface temperature(s) of the frozen ice cream products 6 leaving the freezing apparatus 2.

A closer view of a product plate 5 carrying a number of frozen ice cream products 6 is illustrated in FIG. 2. The illustrated frozen ice cream products 6 are of a type including an ice cream stick 7. The invention, however, is not limited to methods and systems related to the freezing of such types of frozen ice cream products 6. Rather, the invention is relevant for any method or system for producing frozen ice cream products 6 from pre-products conveyed through a freezing apparatus 2.

FIG. 3 shows a closer view of a part of the work table 3 just outside the freezing apparatus 2. A temperature sensor 4, such as for instance an infrared sensor, is arranged over the conveyor 8, which is covered with product plates 5 carrying frozen ice cream products 6 with ice cream sticks 7.

The temperature sensor 4 is used for measuring surface temperatures of the frozen ice cream products 6, which have just left the freezing apparatus 2. The measured surface temperatures are used in a control device (not shown) of the freezing system 1 for setting operational parameters of the freezing apparatus 2. These operational parameters can, for instance, include one or more evaporation temperatures and, thereby, one or more air temperatures within the freezing apparatus 2, one or more fan speeds and, thereby, one or more speeds of air circulated within the freezing apparatus 2 and/or a speed of a conveyor 8 extending within the freezing apparatus 2 and, thereby, the period of time passed from a given product to be frozen enters the freezing apparatus 2 to the same product leaves the freezing apparatus 2 again as a frozen product 6.

Apart from measured surface temperatures, the control device can take other properties into account when regulating and controlling the operational parameters of the freezing apparatus 2. For instance, one or more torque values, such as the maximum torque value, exerted by a driving arrangement when lifting the frozen products 6 off the product plates 5 or vision control or other methods to make sure that the frozen products 7 do not stick to the product plates 5 when being lifted off can be used as input for the regulation loop together with the measured surface temperatures for obtaining an even better control of the operational parameters of the freezing apparatus 2.

Preferably, the control of the one or more operational parameters are performed in such a way that the one or more measured surface temperatures and, if applicable, the one or more measured torque values are kept within ranges, which are calculated taking into account certain product-specific parameters, such as the size and shape of the products 6 and the materials from which the products 6 are made.

Similarly, the algorithms for controlling the one or more operational parameters takes into account certain product-specific parameters, such as the size and shape of the products 6 and the materials from which the products 6 are made.

FIG. 4 illustrates a closer view of the subsequent part of the work table 3 reached by the product plates 5 on the conveyor 8.

A number of product holders 9 corresponding to the number of frozen ice cream products 6 on each product plate 5 are arranged around a product plate hammer 10 and over the conveyor 8. For each product plate 5 passing by, this arrangement is lowered so that each of the product holders 9 holds one of the frozen ice cream products 6 in place against the product plate 5 while the product plate hammer 10 is activated and strikes the product plate 5 a few times. If the frozen ice cream products 6 are sufficiently frozen, oscillations through the product plate 5 caused by the strokes of the product plate hammer 10 will loosen the frozen ice cream products 6 from the product plate 5.

The next part of the work table 3 reached by the product plates 5 on the conveyor 8 is illustrated in a closer view in FIG. 5.

Here, a pick and place product transfer 11 is arranged, comprising a plurality of gripper tongs 12 for gripping the frozen ice cream products 6 and lifting them off the product plates 5 for transferring them to further processing or packaging. In the illustrated embodiment, in which the frozen ice cream products 6 are equipped with ice cream sticks 7, the gripper tongs 12 preferably grip the frozen ice cream products 6 by these sticks 7. In other embodiments, where there may be no ice cream sticks 7, the gripper tongs 12 can grip the frozen ice cream products 6 directly at the ice cream material, or other tools than gripper tongs 12 can be used for lifting the frozen ice cream products 6 off the product plates 5.

FIG. 6 is a flow diagram showing the basic method steps of a production process according to a preferred embodiment of the invention.

Pre-products are to be frozen are conveyed into the freezing apparatus 2 (PPIN), inside which they are cooled to form frozen ice cream products 6 (FRZ). After having conveyed the frozen ice cream products 6 thus produced out of the freezing apparatus 2 again (FPOUT), one or more surface temperatures of the frozen ice cream products 6 are measured (STM), for instance by means of one or more infrared temperature sensors 4, and the frozen ice cream products 6 are transferred to further processing or packaging (FP).

During the production process, the measured surface temperatures are continuously fed to and used by a control device (not shown) of the freezing system 1 for setting operational parameters of the freezing apparatus 2 so that the freezing process (FRZ) can be optimized for subsequent pre-products to be frozen passing through the freezing apparatus 2.

LIST OF REFERENCE NUMBERS

1. Freezing system
2. Freezing apparatus
3. Work table
4. Temperature sensor
5. Product plate
6. Frozen ice cream product
7. Ice cream stick
8. Conveyor
9. Product holder
10. Product plate hammer
11. Gripper tongs
12. Pick and place product transfer
PPIN. Conveying of pre-products into freezing apparatus
FRZ. Cooling of pre-products to form frozen products
FPOUT. Conveying of frozen products out of freezing apparatus
STM. Surface temperature measurement
FP. Further processing or packaging of frozen products
REG. Regulation of operational parameters of freezing apparatus

The invention claimed is:

1. A method for producing frozen ice cream products, using a freezing system comprising a freezing apparatus, said method comprising:
   placing pre-products to be frozen onto a number of product plates,
   conveying pre-products to be frozen into the freezing apparatus,
   cooling the pre-products to form frozen products while conveying the pre-products inside the freezing apparatus by exposing them to circulating cold air,
   conveying the frozen products out of the freezing apparatus,
   measuring one or more surface temperatures of frozen products leaving the freezing apparatus,
   using the one or more measured surface temperatures as input for a control device for controlling one or more operational parameters of the freezing apparatus, lifting the frozen products off the product plates, after conveying them out of the freezing apparatus, by means of a product handling system driven by a driving arrangement, and measuring one or more torque values exerted by the driving arrangement during the lifting of the frozen products off the product plates, and inputting the one or more measured torque values into a control device for controlling one or more operational parameters of the freezing system.

2. The method according to claim 1, wherein the freezing system further comprises a work table and wherein the product plates are placed on the work table when the pre-products to be frozen are placed onto the product plates and/or when the frozen products are lifted off the product plates.

3. The method according to claim 1, further comprising, before the lifting of the frozen products off the product plates:

striking the product plates while holding the frozen products in place thereon.

4. The method according to claim 1, wherein the one or more measured torque values include the maximum torque exerted by the driving arrangement during the lifting process.

5. A method for producing frozen ice cream products, using a freezing system comprising a freezing apparatus, said method comprising:

placing products to be frozen onto a number of product plates before conveying them into the freezing apparatus, cooling the products to form frozen products while conveying them inside the freezing apparatus, recording one or more properties of the frozen product during production, inputting the one or more recorded properties into a control device, lifting the frozen products off the product plates, after conveying them out of the freezing apparatus, by means of a product handling system driven by a driving arrangement, and measuring one or more torque values exerted by the driving arrangement during the lifting of the frozen products off the product plates, and inputting the one or more measured torque values into the control device for controlling one or more operational parameters of the freezing system based upon the one or more recorded properties and the one or more measured torque values.

6. A method for producing frozen ice cream products, using a freezing system comprising a freezing apparatus, said method comprising:

placing pre-products to be frozen onto a number of product plates, the product plates being in an upward facing orientation, conveying the pre-products to be frozen into the freezing apparatus, cooling the pre-products to form frozen products inside the freezing apparatus, the frozen products being frozenly secured to the product plates, conveying the frozen products out of the freezing apparatus, measuring one or more surface temperatures of frozen products leaving the freezing apparatus, inputting the one or more measured surface temperatures to a control device, striking the product plates while holding the frozen products in place thereon in the upward orientation, oscillations through the product plates caused by the striking unsecuring the frozen products from the product plates, lifting the frozen products off the product plates by means of a product handling system driven by a driving arrangement, the product plates being in the upward facing orientation, and measuring one or more torque values exerted by the driving arrangement during the lifting of the frozen products off the product plates, and inputting the one or more measured torque values into a control device for controlling one or more operational parameters of the freezing system based upon the one or more measured surface temperatures and the one or more measured torque values.

* * * * *